Oct. 8, 1935.                H. E. TAUTZ                  2,016,843
                          BALL BEARING CENTER
                          Filed Nov. 7, 1934              2 Sheets-Sheet 1
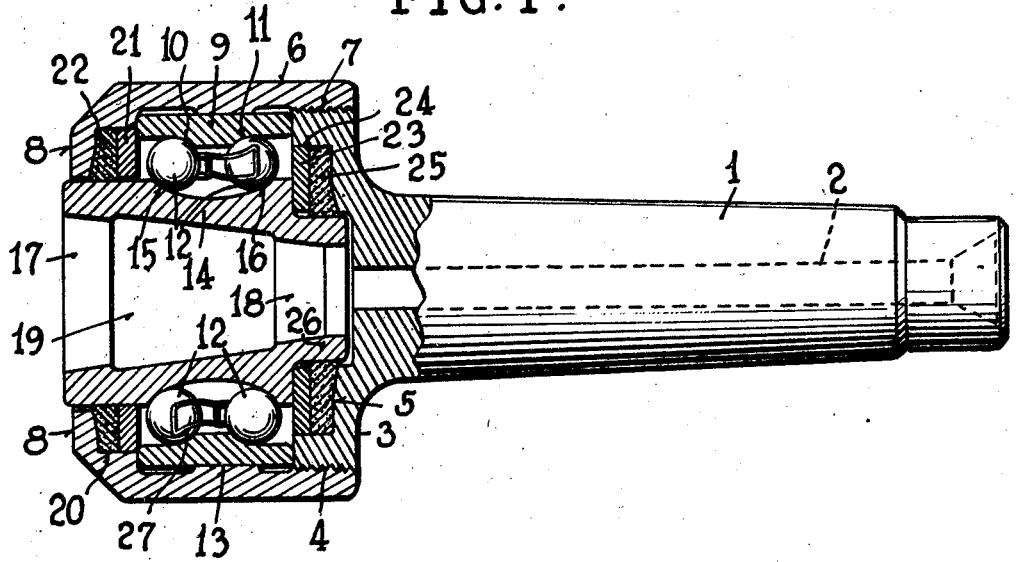
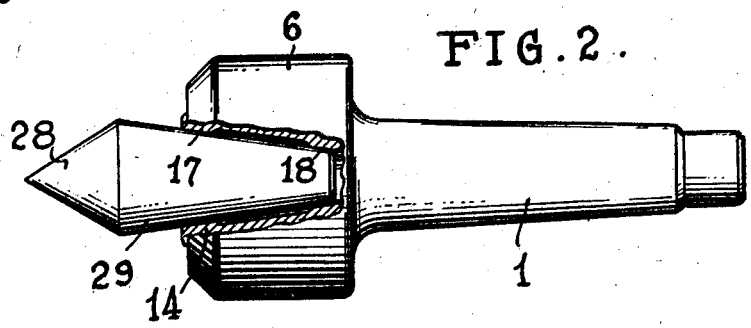
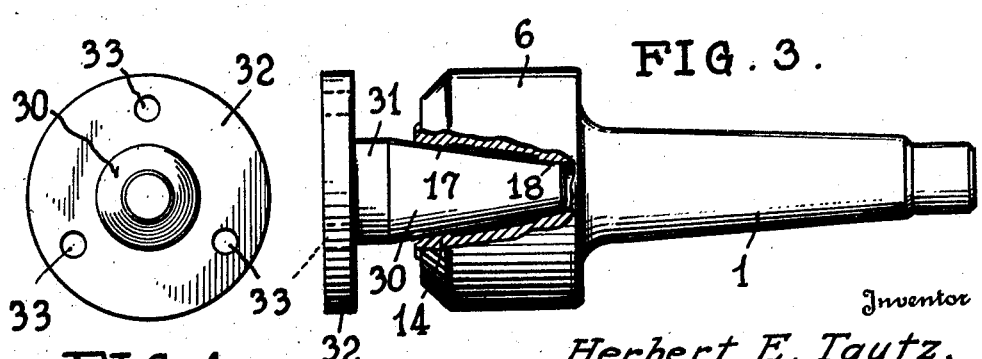
Inventor
Herbert E. Tautz,
By Carl A. Hellmann,
Attorney Oct. 8, 1935. H. E. TAUTZ 2,016,843
BALL BEARING CENTER
Filed Nov. 7, 1934 2 Sheets-Sheet 2

Inventor
Herbert E. Tautz,
By Carl A. Hellmann,
Attorney

Patented Oct. 8, 1935

2,016,843

UNITED STATES PATENT OFFICE 2,016,843

BALL BEARING CENTER

Herbert E. Tautz, Milwaukee, Wis., assignor to Delta Manufacturing Company, Milwaukee, Wis.

Application November 7, 1934, Serial No. 751,920

9 Claims. (Cl. 82—33)

The present invention relates to a ball-bearing center.

More specifically it relates to a center for use in the tail stock of a lathe or other tool to provide a relatively frictionless support for a workpiece.

Still more specifically the invention relates to a center of the type which may be secured in any desired way in such tail stock or the like and which in turn rotatably supports a removable work support, said work supports being of various kinds and arranged to be readily interchangeable in the same center. This is accomplished preferably by providing the center with a supporting shank having a standard taper while the center itself has at its other end a socket supported on ball bearings and shaped to a much steeper taper than the ordinary standard taper, whereby such socket is adapted to receive various work supports which may be readily removed by reason of their relatively steep taper, but which nevertheless provide firm and correctly centered supports for the workpieces when in use.

A further object of the invention is to provide a ball-bearing center which may be readily and economically manufactured and wherein the ball bearing is completely sealed and need never be taken apart in normal operation, thus preventing the loss of its lubricant and simultaneously avoiding the possibility of allowing dirt or grit to enter thereinto and thus injure the bearings.

Other objects and advantages of the invention will appear from the following specification, wherein a preferred embodiment of the center is disclosed, in connection with the accompanying drawings.

Figure 5:
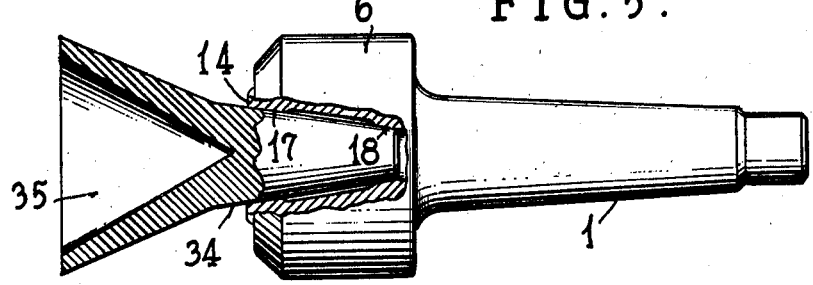
Figure 6:
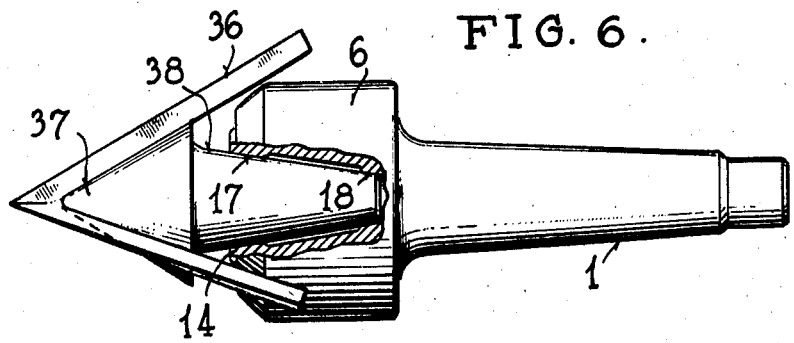
Figure 7:
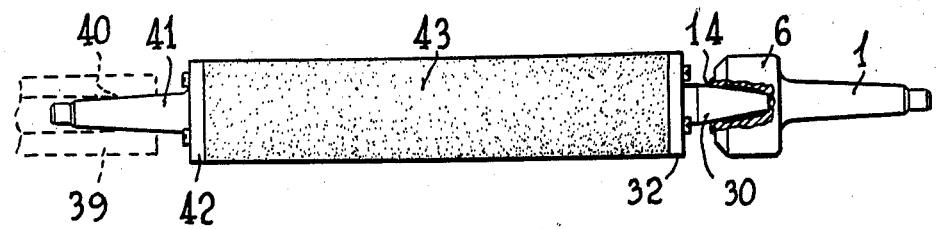
Figure 8:
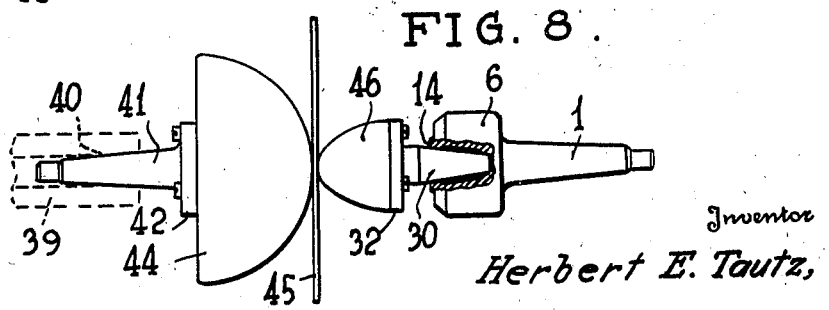

In said drawings:

Fig. 1 is a side elevation of a ball-bearing center, partly in central longitudinal section, Fig. 2 is a partly sectional elevation of a ball-bearing center, showing a 60° work support held thereby, particularly for supporting and centering metal workpieces, Fig. 3 is a partly sectional elevation of a ball-bearing center, showing a face plate having a taper shank secured therein, particularly for use in connection with wooden or other workpieces, Fig. 4 is an end view of the face plate alone of Fig. 3, as seen from the right, Fig. 5 is a partly sectional elevation of a ball-bearing center, showing a female 60° center, having a taper shank, engaged therein, Fig. 6 is a partly sectional elevation of a ball-bearing center, showing a three-pronged special center for supporting pipes or other hollow or tubular articles and having a taper shank engaged in the ball-bearing center, Fig. 7 is a diagrammatic view showing how the ball-bearing center may be used in cooperation with the live spindle of a lathe or similar tool to support a long sanding drum or the like between live and dead centers, and Fig. 8 is a diagrammatic view showing how the ball-bearing center may be used to support a workpiece against a form rotated by a live spindle, for spinning and similar operations.

Similar reference characters in all the figures refer to corresponding parts.

Referring first to Fig. 1 it will be noted that the ball-bearing center comprises a shank portion 1 which may have a standard "Morse" or similar taper for cooperation with a similarly shaped socket, for example in the tail stock of a lathe or the like. This shank is preferably provided with a bore 2 extending therethrough from end to end. At one end the shank 1 leads to an enlarged portion 3 provided with external screw threads as shown at 4 and preferably cupped or hollowed as shown at 5.

A casing or nut 6 having screw threads 7 is threaded upon the member 3 and has an inwardly extending flange 8 at its other end, thus serving to partially enclose and secure the internal bearing member of the center, which will be described hereinafter.

Supported within the tubular flanged nut or casing 6 is the outer race 9 of the ball bearing proper which is provided with properly shaped seats at 10 and 11 to receive and form tracks for the balls 12. Preferably the outer race 9 is arranged to fit closely within an inwardly projecting portion or seat 13 of the housing or nut 6 whereby said race 9 may be correctly centered with respect to the shank 1.

The inner race 14 which cooperates with the said balls 12 has corresponding tracks 15 and 16 formed on its outer surface, the dimensions of the inner and outer races and of the balls being preferably so correlated that there is no perceptible play between the inner race 14 and the shank 1 in operation; in other words, the bearing is preferably heavily initially stressed or pre-loaded, and the parts are preferably fitted accurately so as to eliminate any lost motion or wobble.

The inner race 14 which is substantially frusto-conical in shape is preferably provided with two inwardly extending seats, 17 and 18 respectively, with a depressed portion 19 between the same, the surfaces 17 and 18 being machined carefully to constitute zones of the same cone whereas the portion 19 between the same need not be shaped accurately as it does not form a positioning surface.

The housing 6 is preferably bored or otherwise formed as shown at 20 to receive a metallic washer 21 which fits closely within the housing 6 but loosely about the inner race 14. A sealing washer 22, preferably made of felt or similar material, may be interposed in the space within the bore 20 and between the flange 8 and the washer 21, this felt washer 22 bearing against the outer surface of the inner race 14.

At the rear end of the cavity within the housing a similar pair of washers may be provided, namely, a metallic washer 23 fitting closely within a bore 24 in the enlarged portion 3 integral with the shank 1, said washer 23 fitting loosely about the inner race 14, and a felt washer 25 may be interposed between the washer 23 and the wall of the enlarged portion 3, said washer 25 bearing against the inner extension 26 of the inner race 14. If desired, customary cages or spacers 27 may be provided to maintain the various balls 12 in their proper relative positions in the manner usual in ball bearings.

Referring now to Fig. 2, the device illustrated in Fig. 1 is here shown in cooperation with a standard or 60° center, such as is particularly useful in connection with metal work. The 60° center comprises the conical point 28 which is made in the ordinary way to have a 60° angle and a taper shank portion 29, the taper of which, however, is much steeper than the taper of the shank 1. This taper shank 29 is made to fit within the socket in the inner race 14, contacting with the same at 17 and 18. By reason of this greater steepness of taper it is comparatively easy to dislodge the 60° center from the socket, which would not be the case with a standard taper, such as that of the shank 1.

Referring now to Figs. 3 and 4 the device is shown in cooperation with a face plate 32 here shown as having a plurality of holes 33 therein adapted to receive screws in the customary manner, the face plate 32 having a shank 31 attached to the rear thereof, said shank terminating in a tapered portion 30 of the same steep taper as the shank 29 shown in Fig. 2 and adapted to fit within the socket in the inner race 14 interchangeably with the 60° center above described.

Referring now to Fig. 5 there is shown a hollow or female center also of 60° type, as at 35, having a shank 34 with a steep taper fitting in the socket in the inner race 14.

Fig. 6 illustrates a pipe or tube supporting center made with ribs 36, three being shown in the present instance, said ribs being supported in the customary way on a central, preferably conical, hub 37 having a shank 38 of the same steep taper as those previously described and fitting in the socket in the inner race 14, just as do the other attachments.

Fig. 7 shows how the device may be used in cooperation with the live spindle 39 of a lathe or similar tool, said live spindle having a bore with a standard taper 40 receiving a face plate or similar attachment 42 having a shank 41 which serves as one end support of a sanding drum or the like 43 which is to be rotated by the live spindle 39. Where such sanding drum is relatively short it is unnecessary to provide any additional support for the same, but in the case of a relatively long drum, such as that shown, a freely rotatable support 32 may be provided at the end remote from the live spindle, said support or face plate 32 being made as shown in Figs. 3 and 4, and having its steeply tapered shank 30 received in the socket in race 14 as shown.

Fig. 8 shows how the device may be used in cooperation with a lathe or similar tool for metal spinning operations or the like. Here a face plate or support 42 having a taper shank 41 is fitted into the corresponding taper bore 40 of a lathe spindle or the like 39, said face plate 42 having secured thereto a form 44 corresponding to the shape to be given to the metal workpiece 45 in spinning. In order to support this metal workpiece use may again be made of the face plate 32 with its shank 30 supported in the socket in race 14, said face plate carrying a suitably shaped supporting block 46 which may be made to bear against the center of the metallic blank or workpiece 45 in order to hold the same against the form 44 during the spinning operation.

The operation of the device will be clear from the above description of the structure thereof. It should be noted in particular that the bearing balls and the cooperating races are effectively sealed against any possible entrance of grit, chips or dust from the outside, by reason of the felt washers 22 and 25, and, furthermore, that the lubricant which is supplied to the ball bearings is likewise protected against escape to the outside of the device by the same felt washers. Consequently, a single filling of lubricant in the bearings will last practically indefinitely, usually for the entire life of the device. This is a great advantage in the case of tools and appliances which are to be used in home work shops, as it eliminates the necessity for either providing lubricating holes through which lubricant may be inserted into the bearings, which is objectionable because such holes are likely either to become clogged and/or to admit grit and foreign materials into the bearing, or for taking the bearing apart for cleaning and lubrication.

By reason of the relatively slight taper of the shank 1 which, as stated, is made of a standard machine taper, this shank will fit firmly and closely into a correspondingly tapered socket in the tail stock of a lathe or the like, whence it may also be readily removed in the customary way, by backing off the tail stock by means of its handle. The case is different, however, with the attachment which is held in the inner race 14. If this inner race 14 were also made with a standard taper, difficulty would be encountered in removing the attachments held within said race and to avoid such difficulty the taper of the surfaces 17 and 18 of this race is made much steeper than the usual standard taper.

This does not in any way sacrifice the accuracy of centering of any attachment inserted into said race, but it effectively prevents such devices from becoming wedged as tightly as they would with a smaller taper. In order to remove any such tapered device held in the race 14 it is sufficient to make use of the bore 2 extending through the shank 1 and adapted to receive a rod or the like which may be used to drive out the attachment. In this connection attention is directed to the fact that this prevents undue straining of the ball bearing, since the smaller force required in driving out the attachment from the race does not strain the ball bearings severely and, therefore, does not injure the alinement or accuracy thereof.

While certain definite attachments have been illustrated and described as received in the race 14 in the various figures, it will be obvious that the usefulness of the device is not in any way restricted to the particular attachments shown, which are here disclosed merely for purposes of illustration.

An important feature is the ready interchangeability of various attachments within the race 14, such as a 60° center, a face plate, a hollow center, a pipe center, etc., and the relative simplicity of the present device makes it possible to manufacture the same at a comparatively low cost, thus putting it within the reach of the amateur craftsman and the small commercial shop which could not afford the expense involved in former devices of this kind, which while more expensive were also less universal in their range of usefulness and in fact were customarily restricted to a single use, such for example as a non-removable 60° center.

While the specific form of device herein disclosed is provided with ball bearings, it is obvious that the invention is not restricted to bearings having balls, but other types of anti-friction bearing elements, such as cylindrical or conical rollers, etc., may be substituted, if preferred, and the term anti-friction element when used in the claims is, therefore, to be construed broadly to include any rolling element which may, but need not necessarily, be a ball, which is interposed between the stationary race and the rotatable race.

Having described a preferred form of the invention and shown a number of uses thereof, it should be understood that the invention is not restricted to the particular form disclosed, but that its form may be modified considerably without departing from the spirit of the invention, which is defined by the following claims.

I claim:

1. An anti-friction bearing center comprising a stationary shank having a housing at one end, an outer race rigidly held in said housing, anti-friction bearing elements mounted in said race, and an inner race rotatably mounted within said elements, said inner race having a substantially frusto-conical bore therein.

2. An anti-friction bearing center comprising a stationary tapered shank having a housing at one end, an outer race rigidly held in said housing, anti-friction bearing elements mounted in said race, and an inner race rotatably mounted within said elements, said inner race having a substantially frusto-conical bore therein, having a greater taper than the shank.

3. An anti-friction bearing center comprising a stationary shank having a housing at one end, an outer race rigidly held in said housing and having two ball tracks therein, a set of bearing balls mounted in each track of said race, and an inner race rotatably mounted within said balls, said inner race having two cooperating ball tracks therein and having a substantially frusto-conical bore.

4. An anti-friction bearing center comprising a stationary tapered shank having a housing at one end, an outer race rigidly held in said housing and having two ball tracks therein, a set of bearing balls mounted in each track of said race, and an inner race rotatably mounted within said balls, said inner race having two cooperating ball tracks therein and having a substantially frusto-conical bore, having a greater taper than the shank.

5. An anti-friction bearing center comprising a stationary tubular shank having a housing at one end, an outer race rigidly held in said housing, anti-friction bearing elements mounted in said race, and an inner race rotatably mounted within said elements, said inner race having a substantially frusto-conical bore therein.

6. An anti-friction bearing center comprising a stationary tubular tapered shank having a housing at one end, an outer race rigidly held in said housing, anti-friction bearing elements mounted in said race, and an inner race rotatably mounted within said elements, said inner race having a substantially frusto-conical bore therein having a greater taper than the shank.

7. An anti-friction bearing center comprising a stationary shank having a housing at one end, an outer race rigidly held in said housing, anti-friction bearing elements mounted in said race, an inner race rotatably mounted within said elements, said inner race having a substantially frusto-conical bore therein, and a work support having a shank fitting in said bore.

8. An anti-friction bearing center comprising a tapered stationary shank having a housing at one end, an outer race rigidly held in said housing, anti-friction bearing elements mounted in said race, an inner race rotatably mounted within said elements, said inner race having a substantially frusto-conical bore therein, of greater taper than the shank and a work support having a shank fitting in said bore.

9. An anti-friction bearing center comprising a tapered tubular stationary shank having a housing at one end, an outer race rigidly held in said housing, anti-friction bearing elements mounted in said race, an inner race rotatably mounted within said elements, said inner race having a substantially frusto-conical bore therein, of greater taper than the shank and a work support having a shank fitting in said bore.

HERBERT E. TAUTZ.